(12) United States Patent
Gunn et al.

(10) Patent No.: US 12,445,225 B2
(45) Date of Patent: Oct. 14, 2025

(54) COMPLEXITY ORDERED STATISTIC DECODING USING IMPROVED BIT FLIPPING PATTERN ORDERING

(71) Applicant: L3Harris Technologies, Inc., Melbourne, FL (US)

(72) Inventors: Joshua D. Gunn, Farmington, UT (US); Ryan W. Hinton, Erda, UT (US)

(73) Assignee: L3 Harris Technologies, Inc., Melbourne, FL (US)

( * ) Notice: Subject to any disclaimer, the term of this patent is extended or adjusted under 35 U.S.C. 154(b) by 165 days.

(21) Appl. No.: 18/244,520

(22) Filed: Sep. 11, 2023

(65) Prior Publication Data

US 2025/0088309 A1 Mar. 13, 2025

(51) Int. Cl.
*H04L 1/00* (2006.01)

(52) U.S. Cl.
CPC .......... *H04L 1/0052* (2013.01); *H04L 1/0054* (2013.01); *H04L 1/0076* (2013.01)

(58) Field of Classification Search
CPC .... H04L 1/0052; H04L 1/0054; H04L 1/0076
See application file for complete search history.

(56) References Cited

U.S. PATENT DOCUMENTS

| | | | |
|---|---|---|---|
| 2005/0210358 A1* | 9/2005 | Chouly | H03M 13/453 714/753 |
| 2013/0232397 A1* | 9/2013 | Summerson | H04L 1/0076 714/807 |
| 2022/0216886 A1* | 7/2022 | Choi | H03M 13/451 |

OTHER PUBLICATIONS

NPL reference Wu: Yingquan Wu and Christoforos N. Hadjicostis, "Soft-Decision Decoding of Linear Block Codes Using Preprocessing and Diversification," IEEE Transactions On Information Theory, vol. 53, No. 1, Jan. 2007. (Year: 2007).*

NPL reference Chang: Chang, Chi-Yuan ; Su, Yu T. ; Chen, Yu-Liang ; Liu, Yin-Chen, "Check Reliability Based Bit-Flipping Decoding Algorithms for LDPC Codes," publication: eprint arXiv: 1001.2503, publication date: Jan. 14, 2010, available at: arxiv.org/pdf/1001.2503v1. (Year: 2010).*

NPL reference Fossorier: Fossorier, M.P.C, and Shu Lin. "Soft-Decision Decoding of Linear Block Codes Based on Ordered Statistics." IEEE transactions on information theory 41.5 (1995): 1379-1396. (Year: 1995).*

(Continued)

*Primary Examiner* — David B Lugo
(74) *Attorney, Agent, or Firm* — Fox Rothschild LLP; Carol E. Thorstad-Forsyth

(57) ABSTRACT

A decoding method implemented at a decoder. The method includes determining a current channel realized reliability metric for each symbol in a received sequence of symbols. The current channel realized reliability metrics of the symbols are then sorted to identify a predetermined number of most reliable independent bits in the sequence. A set of one or more bit-flip patterns are then enumerated based on the current channel realized reliability metrics of the predetermined number of the most reliable independent bits in the sequence. The set of bit-flip patterns or a subset thereof are then applied to a received vector corresponding to the sequence of symbols to decode a codeword.

19 Claims, 8 Drawing Sheets

(56) References Cited

OTHER PUBLICATIONS

Collison, "Extending the Dorsch decoder for efficient soft decision decoding of linear block codes," Master of Science in Computer Engineering Thesis, Washington State University, 76 pages, Retrieved from the Internet: <http://www.dissertations.wsu.edu/Thesis/Spring2009/s_collison_042309.pdf> (2009).

Dong and Qiao, "Selecting Error Patters Based on Symbol Reliability For OSD Algorithm," 2nd IEEE International Conference on Future Computer and Communication, ICFCC 2010, pages V2-330, (2010).

Scholl and When, "Hardware Implementation of a Reed-Solomon Soft Decoder based on Information Set Decoding" Proc., Design, Automation & Test in Europe Conference & Exhibition, pp. 1-6 (2014).

Alnawayseh et al., "Ordered statistics-based list decoding techniques for linear binary block codes", Alnawayseh and Loskot EURASIP Journal onWireless Communications and Networking, 2012, Article No. 314, pp. 1-12.

Fossorier et al., "Soft-Decision Decoding of Linear Block Codes Based on Ordered Statistics", IEEE Transactions On Information Theory, vol. 41, No. 5, Sep. 1995, pp. 1379-1396.

Han et al., "Efficient Priority-First Search Maximum-Likelihood Soft-Decision Decoding of Linear Block Codes", IEEE Transactions On Informon Theory, vol. 39, No. 5, Sep. 1993, pp. 1514-1523.

Kabat et al., "New Approach to Order Statistics Decoding of Long Linear Block Codes", IEEE GLOBECOM 2007—IEEE Global Telecommunications Conference, 2007, pp. 1467-1471.

Lin et al., "Error Control Coding: Fundamentals and Applications", Jul. 2004, pp. 624.

* cited by examiner

100

COMPLEXITY ORDERED STATISTIC DECODING USING IMPROVED BIT FLIPPING PATTERN ORDERING

STATEMENT REGARDING FEDERALLY SPONSORED RESEARCH

This invention was made with Government support under PA No. 400056980/1000 (200108) Exeter ASIC awarded by Rally, Apollo CDS (700). The government has certain rights in the invention.

BACKGROUND

In a digital communication system, error control coding is used for controlling errors over unreliable or noisy communication channels. The sender encodes each message with redundant information to form a codeword. This encoding adds redundant parity bits. For example, data that is originally 30 bits long may be encoded with an additional 98 redundant parity bits to create a 128-bit codeword. The redundancy allows the receiver to detect a limited amount of corruption, added entropy, degradation, or uncertainty (referred to herein as errors) that may occur anywhere in the message, and often to correct these errors without retransmission. The maximum scope of errors that can be corrected is affected by the design of the error control coding/decoding methods, such that different error control coding/decoding methods are suitable for different conditions.

The various decoding methods can be computationally intensive requiring significant computer resources to accomplish. Thus, improvements to various decoding methods and systems that can economize system resource usage are desirable.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a decoding method. The method includes determining a current channel realized reliability metric for each symbol in a received sequence of symbols. The current channel realized reliability metrics of the symbols are then sorted to identify a predetermined number of most reliable independent bits in the sequence. A set of one or more bit-flip patterns are then enumerated based on the current channel realized reliability metrics of the predetermined number of the most reliable independent bits in the sequence. The set of bit-flip patterns or a subset thereof are then applied to a received vector corresponding to the sequence of symbols to decode a codeword.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments that are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1:
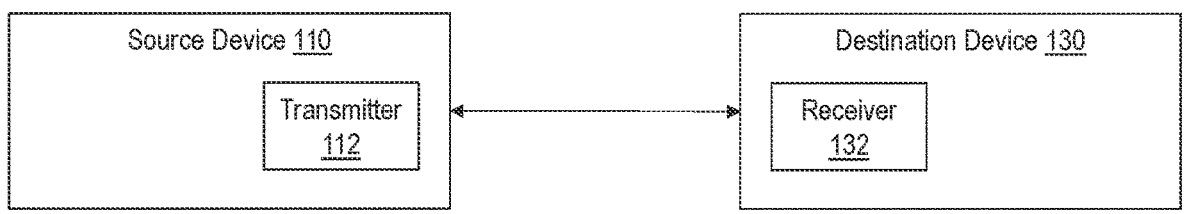
FIG. 1 illustrates an example of a wireless digital communication system.

The embodiments described herein are related to a method, or a channel realization dependent ordered decoder configured to perform a novel decoding on a received codeword. In some embodiments, the novel decoding method accomplishes improved decoding, such as improvements in time required to perform decoding and/or improvements in processing power needed to perform decoding.

Note that previous decoding typically identifies the k most reliable bits of an n-bit codeword. For example, when 30 data bits have been encoded into a 128-bit codeword, a system may identify the 30 most reliable bits of the 128-bit codeword. The k most reliable bits may be input into a decoder (typically including a decoder matrix and a hamming weight generator) to attempt to recover (or at least identify similarity to) the data bits. Additionally, certain bits in the k most reliable bits may be flipped such that k bits, including one or more that are flipped in addition to remaining unflipped bits from the k most reliable bits are input into the decoder to attempt to recover the data bits. A simple decoding process simply iteratively flips one bit of the k most reliable bits at a time and inputs the k bits (including a single flipped bit) to the decoder. This is repeated until all k bits of the k most reliable bits have been flipped. This may be followed by flipping two bits of the k most reliable bits at a time and applying k bits, including two flipped bits to the decoder. This is repeated until a desired order (i.e., number) of bit flips per k bits is achieved. In some examples, Maximum Likelihood (ML) decoding can be performed. In ML decoding, every possible combination of bit flips in a space is tried and the lowest cost codeword is determined as the ML solution. Understandably, this brute force process can require significant time and computing resources to perform. Indeed, there are typically too many codewords to try all of them under time and processor constraints.

In contrast, embodiments herein can perform a more efficient decoding operation, in terms of time and/or computing resources required to perform the decoding. For example, when there is only sufficient time or processing power for a subset of bit-flip patterns to be tried, embodiments illustrated herein can be used to perform the decoding operation within the limited time or only using the limited processing power by optimizing which bit flip patterns (and corresponding codewords) are tried. Some embodiments of the novel decoding method may further improve average throughput by finding a desired codeword earlier. In particular, embodiments illustrated herein are a very close approximation of ML decoding. Thus, channel realization dependent ordered decoding is able to find the ML solution codeword while only trying a small fraction of the possible codewords.

This is accomplished by creating a channel realization dependent schedule that is used to select the order of bit flips in a received vector. In particular, individual current bit reliability, for a currently implemented system, is measured. For example, a matched filter used in a QPSK or BPSK receiver of a Gaussian channel is able to produce current realized reliability metrics. That bit reliability is used to create a schedule for selecting bits to flip from a received vector in an optimized fashion to reduce the number of bit flips that are required to decode the received vector to a codeword. Note that previous systems that have provided schedules have done so based generically using long term reliability (including reliable determined using data received over time, and thus not current realized reliability) or estimated channel reliability and the order of the bits sorted according to an estimated or long term reliability metric, without respect to the actual values of the current reliability metrics. In contrast, embodiments herein take into account current realized bit reliabilities, as affected by factors such as noise, channel losses, and other factors of the actual current channel where the system is implemented.

Further, embodiments accomplish the functionality by trying as many codes as time and/or processor power allows. Usually, this is expressed as a limit of bit flip pattern weights. The example below uses a maximum weight of 3. That is, bit flip patterns will be tried up to and including the maximum weight. However, this portion of the process may be terminated early if a codeword is found with a cost that is smaller than a predetermined threshold. The threshold is calculated with a bound that guarantees the ML codeword. In some embodiments, if the hard decision of the received vector is already a valid codeword, then additional searching can be terminated.

For example, one embodiment receives a vector and uses certain criteria explained in more detail below to select a certain number (k) of most reliable bits from the received vector having a certain number (n) of bits. For example, if a 128 bit vector is received, the most reliable 30 bits may be selected. The number k of selected bits is often dependent on the original number of data bits before parity bits are added. Thus, in the present example, 30 data bits may be encoded resulting in 98 parity bits being added to create the 128-bit codeword. These most reliable bits may then be ranked in order of least reliable to most reliable according to an obtained bit reliability metric. The reliability metric is based on the actual, current realization of the effects applied to a transmitted bit by the channel. The reliability metrics for the bits are then used to select a schedule of bit flipping patterns for the received vector. Note that the reliability metrics are used in a fashion where least reliability flipping is performed no matter the number of bit flips that occur. Thus for example, the schedule may include a single bit being flipped, followed by two bits being flipped, followed by a different single bit being flipped. In this example, the two bits in combination are less reliable than the different single bit. A more detailed example will be illustrated below.

Embodiments may have a maximum number of bit flip patterns that can be tried for a particular received vector. Assume for example, that an embodiment allows trying all bit flip patterns up to weight three. Embodiments may first check to see if valid data can be recovered without flipping any bits, which is equivalent to a weight-zero bit flip pattern. If not, embodiments may flip the least reliable bit (of the most reliable bits) to see if valid data can be recovered. If not, embodiments may flip some combination of bits, selected based on an order of bit combinations that is based on the reliability metrics for individual bits, to see if valid data can be recovered. Thus, this process continues until valid data is recovered, or until some other predetermined condition is met indicating that the process should be halted. With this introduction, additional details are now illustrated.

Embodiments of the invention described herein improve the order of bit flip patterns from previous decoders by utilizing the current channel realized reliability of the k most reliable independent bits, not just their relative order. Embodiments use current channel realized reliability metrics for the most reliable k bits to select an ordering for bit flipping. The bit flip patterns are tried in order of decreasing likelihood (of error) and decoding is successful as soon as a valid codeword of sufficient reliability is found. Enumerating the sums of the current channel realized reliability metrics for all combinations of bit flip patterns up to a particular weight can be computationally simple (e.g., for high-rate codes where there are likely a relatively small number of errors) compared to re-encoding every combination. Accordingly, the expected number of tries before a suitable codeword is found is lower than the existing order statistics based ordering.

In some embodiments, a threshold may be applied where if a particular error pattern likelihood (i.e., reliability metric cost) falls below a certain threshold value, decoding ceases because the probability that any of the following error patterns has occurred is sufficiently small. In particular, embodiments may be implemented by design such that the ML codeword is guaranteed if a codeword is found with an error pattern likelihood is below the certain threshold value. That is, the certain threshold value is calculated as a bound to make the guarantee.

In some embodiments, after the set of all patterns have been applied and candidate codewords have been found, a distance between the codeword and received vector is calculated. This distance can be, for example, a Euclidean Distance or a Hamming distance. The codeword that is 'closest' to the received vector is declared as the decoded codeword. The probability of error under this scheme is a function of the code and the channel statistics (as well as how many patterns are tried).

In some embodiments, calculating the weight and/or cost of each bit flip pattern can be done while various other re-encode and compare operations are taking place. In some embodiments, properties of probabilities may enable enumeration of likelihoods of error patterns through an appropriately chosen decision tree.

FIG. 1 illustrates an example of an environment of a wireless communication system 100. The wireless communication system 100 includes one or more source devices 110, and one or more destination devices 130. As illustrated, the source device 110 includes a transmitter 112 configured to send out a wireless signal having the destination device 130 as a destination. The destination device 130 includes a receiver 132 configured to receive the signal transmitted by the source device 110. In some embodiments, each of the source devices 110 and destination devices 130 may be a mobile phone, a tablet, a laptop computer, a radio, or any object that is coupled to a communication circuitry and/or device, such as (but not limited to) a ground vehicle, an airplane, a watercraft, and/or a satellite.

Figure 2:
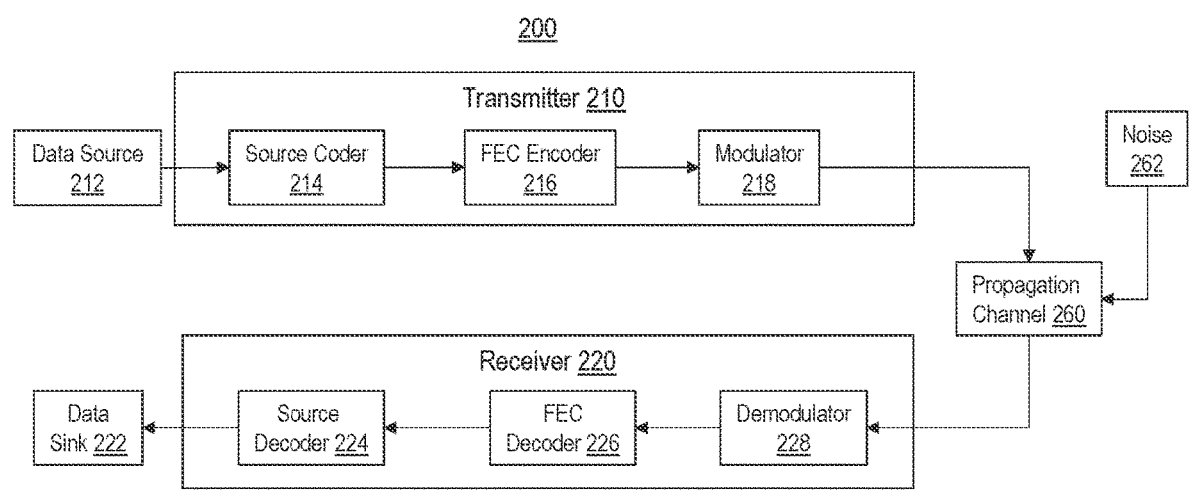
FIG. 2 illustrates an example of a communications link in a wireless digital communication system of FIG. 1.

FIG. 2 illustrates a functional block diagram of an example of a communications link 200, including a transmitter 210 and a receiver 220. The transmitter 210 includes a source coder 214, a FEC encoder 216, a modulator 218, and transmitter hardware (such as various amplifiers, antennas, filters, etc.) configured to transmit a signal on the propagation channel 260. The FEC encoder 216 is configured to add redundancy, for example, in a form for a forward error correction code, in order to make it more resistant to transmission errors introduced by the channel 260. For example, the FEC encoder 216, in the examples above, would use the 30 data bits to create the 128-bit codeword as illustrated in more detail below. The receiver 220 includes receive hardware (such as various antennas, filters, amplifiers, etc.) configured to receive a signal from the propagation channel 260, a demodulator 228, a FEC decoder 226, and a source decoder 224. The FEC decoder 226 is configured to eliminate most or all of the errors that have been introduced by the channel 260. Note, the functional blocks shown in FIG. 2 are oversimplified, and the separation of the functional blocks in embodiments are not necessarily the same as shown in FIG. 2. One or more of these functional blocks in FIG. 2 may be combined into a single electronic device, including complex circuitry, one or more generic processors and/or storages that are configured to execute custom or generic firmware and/or software to achieve the desired results.

Figure 3:
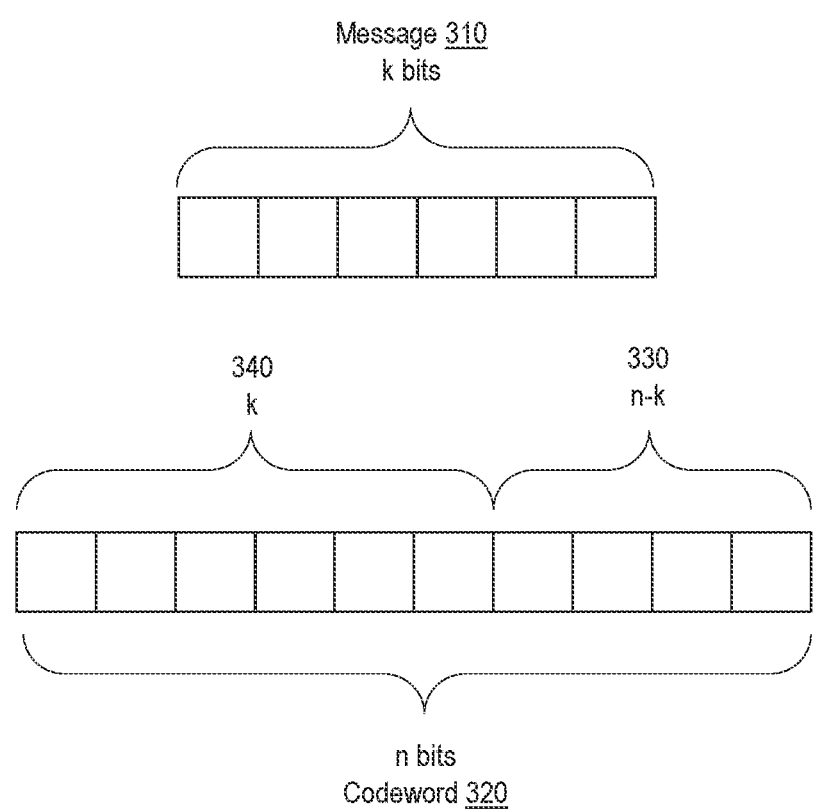
FIG. 3 illustrates an example of a message being encoded into a codeword.

Additionally, since the principles described herein are related to FEC coding and decoding, a brief introduction to FEC coding and decoding is provided with respect to FIG. 3. FIG. 3 illustrates an example of a message 310 and a codeword 320. Each message 310 has a predetermined number k bits, and a codeword 320 has a predetermined number n bits, wherein n>k. In an error control coding process, each message 310 of k bits is encoded to a codeword 320 of n bits. Since each message only includes k bits, the total number of possibly different messages is 2^k, which can only be correctly encoded into 2^k valid codewords. However, since the codeword has n bits, technically, the total number of possibly received binary vectors is 2^n. When the received vector is not one of the valid 2^k codewords, the system would know that an error had occurred during the transmission. Notably, each specific system may detect and correct errors differently depending on the coding method and/or the decoding method.

The decoding of the received vector may be performed via a hard decision decoding method and/or a soft decision decoding method. Hard decision decoding takes a sequence of bits or a received vector from a threshold stage of a receiver and decodes each bit by hard classifying it as a 1 or 0. Soft decision decoding is a class of algorithms that uses additional information from the receiver to aid in the decoding of received vectors. Soft decoding considers one or more current channel realized reliability metrics of each received symbol or pulse to form a better estimate of sent data. Such current channel realized reliability metrics include (but are not limited to) log-likelihood ratio (LLR), Euclidean distance, correlation, and/or correlation discrepancy.

For example, let $v=(v_0, v_1, \ldots, v_{n-1})$ be a codeword having n bits. In some embodiments, for transmission, this codeword is mapped into a sequence of symbols. The sequence of symbols are transmitted via a propagation channel and received by a receiver. The symbols of the received sequence $r=(r_0, r_1, \ldots, r_{n-1})$ are reordered in decreasing order based on their respective reliabilities. The reordered sequence r is denoted as $r'=(r'_0, r'_1, \ldots, r'_{n-1})$.

Figure 4:
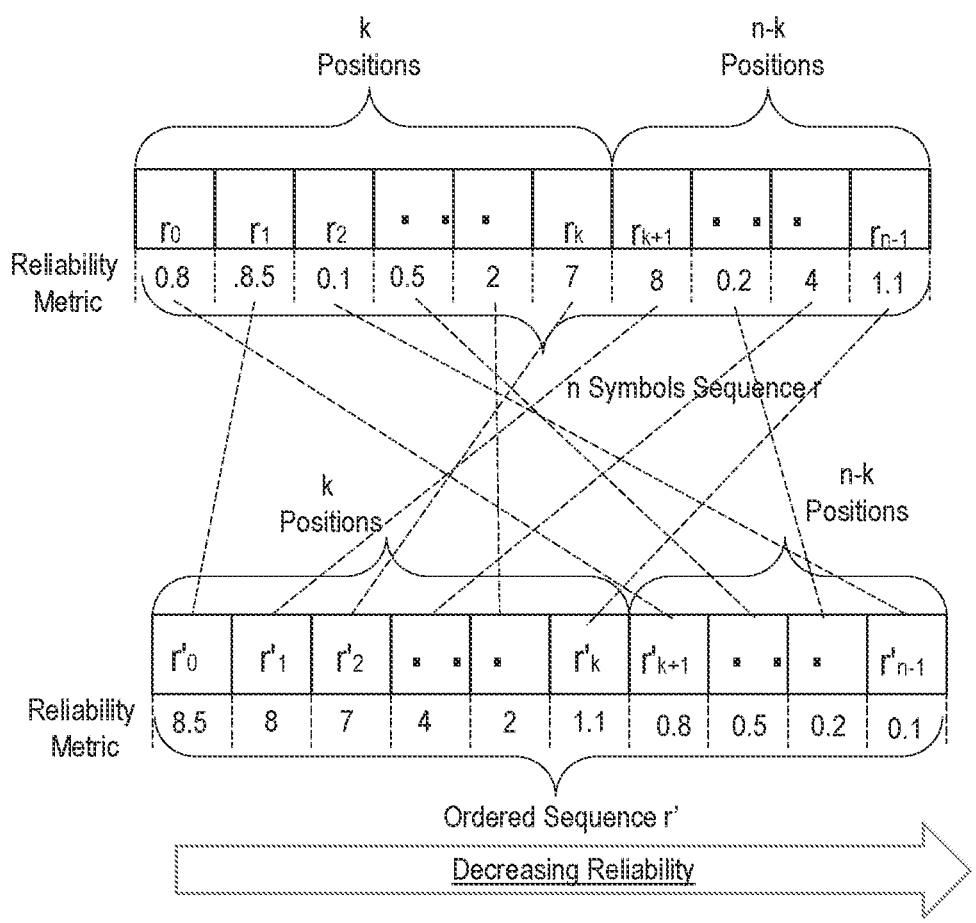
FIG. 4 illustrates an example of a process of sorting a sequence of bits in decreasing order based on reliability metrics.

FIG. 4 illustrates an example of a process of reordering a received sequence r to a reordered sequence r'. As illustrated, the received sequence r includes n symbols, each of which has a reliability metric, which corresponds to the absolute value of the corresponding symbol. For example, the first symbol r0 has a reliability metric 0.8, the second symbol r1 has a reliability metric 8.5, and the rest of the symbols (r2 through rn−1) have their respective current channel realized reliability metrics, 0.1, 0.5, 2, 7, 8, 0.2, 4, and 1.1. The first k bits of the sequence r correspond to k message bits, and the last n-k bits of the sequence correspond to n-k parity bits.

Note that the reliability metric used here is based on the channel realization for each bit as opposed to long term channel reliability parameters or statistics used in previous systems. The current channel realization for each transmitted bit takes into account effects of the propagation channel 260, noise 262, etc. As noted previously, current channel realized reliability metrics can be determined using native functionality of matched filters of certain receivers.

The n bits in the sequence r are then reordered based on their current channel realized reliability metrics in an order of decreasing reliability. The reordered sequence r' is shown at the lower section of FIG. 4. As illustrated, the most reliable symbol r'0 (having a reliability metric 8.5) is placed at far left, the second most reliable symbol r'1 (having a reliability metric 8) is placed next to r'0; and the rest of the symbols (r'2 through r'n−1) having their respective current channel realized reliability metrics in the order of decreasing reliability, 8, 7, 4, 2, 1.1, 0.8, 0.5, 0.2, 0.1 are positioned accordingly.

Further, the sorted n bits in the sequence r' are divided into two groups, namely k most reliable bits and n-k least reliable bits. Note, k is the number of message bits. Although the first k bits of r' are the k most reliable bits, they are not necessarily independent, and therefore they do not always represent an information set. Thus, an additional process is performed to identify the k most reliable independent bits. Different conventional and known processes may be implemented to identify the k most reliable independent bits. For example, in some embodiments, transformations of the generator matrix G and elementary row operations or Gaussian eliminations may be performed to identify the k most reliable independent bits.

In some embodiments, the k most reliable independent bits are processed in an order of increasing reliability. In some embodiments, only several least reliable bits in the k most reliable independent bits are further processed.

Figure 5:
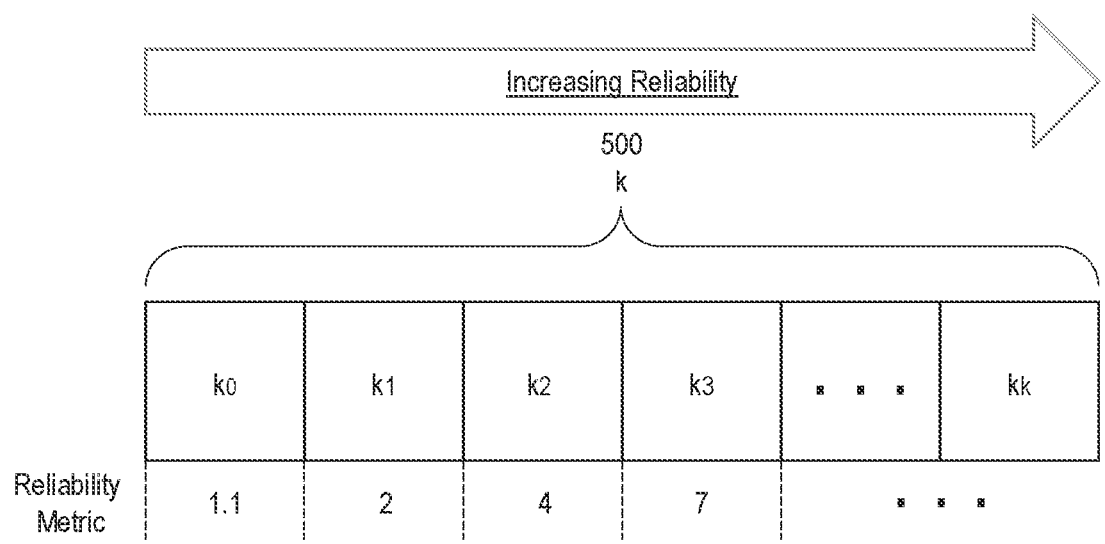
FIG. 5 illustrates an example of a process of enumerating a set of bit-flip patterns based on a predetermined number of most reliable independent bits.

FIG. 5 illustrates an example of a process for processing the k most reliable independent bits. Note that FIG. 5 illustrates a different example, and should not be compared to the numerical values illustrated in FIG. 4. Rather, FIG. 5 illustrates an abbreviated example. As illustrated in FIG. 5, the k most reliable independent bits are now organized in an order of increasing reliability, i.e., k0 (having the lowest reliability metric 1.1) is placed at the far left, k1 (having the second lowest reliability metric 2) is placed next to k0, and so on and so forth.

The FEC decoder uses an enumerated set of one or more bit-flip patterns, starting from the least reliable bit k0 among the most reliable k bits. Each bit-flip pattern includes one or more bits among the k most reliable bit bits that are to be flipped. Each time a bit-flip pattern is applied to z, the bits of the received vector z at the one or more bit locations are flipped to generate a new received information vector of k bits. The new received information vector of k bits is reencoded to a valid codeword vector z'. A reliability metric is then computed for the valid codeword vector z'. This is repeated over the one or more bit-flip patterns, until a suitable reliability metric is obtained or until all of the bit-flip patterns have been tried. In some embodiments, the most reliable reliability metric is used to select a valid codeword vector.

In other embodiments, if all the patterns in the enumerated set have been applied and no suitable reliability is found, the FEC decoder could declare a decoding failure. Alternatively, a second set of one or more bit-flip patterns may be enumerated, and the second set of bit-flip patterns or a subset thereof are applied to the hard decision decoded received vector z. Again, this process may repeat until a suitable reliability is found, or some predetermined conditions are satisfied, such as for example a predetermined period of time has expired, a buffer has recached a certain level, a certain number of patterns have been tested, etc.

In some embodiments, the first set of bit flip patterns includes a first maximum weight, and the second set of bit flip patterns has a second maximum weight that is greater than the first maximum weight. A weight of a bit flip patterns is a total number of bits in different bits that are to be flipped. For example, if a weight in a bit flip pattern is 3, three different bits are to be flipped. In some embodiments, each subsequent set of bit flip patterns increases the weight by one. For example, the first set of bit flip patterns has a maximum weight 3. If no codeword is found after applying each of the first set of bit flip patterns, a second set of bit flip patterns is generated, and the second set of bit flip patterns has a weight 4. If still no codeword is found after applying each of the second set of bit flip patterns, a third set of bit flip patterns is generated, the third set of bit flip patterns has a weight 5, and so on. In some embodiments, the next set of bit flip patterns is being generated and ordered simultaneously while the previous set of bit flip patterns is being applied the hard decision decoded received vector z.

Alternatively or additionally, embodiments may implement successive sets of bit flipping, but where after each set, the distance is measured for all candidate codewords to the received vector. A stopping criterion in such embodiments may be that the distance is less than some predetermined value.

In some embodiments, the enumerated bit-flip patterns may further be filtered based on one or more predetermined rules. Only the filtered bit-flip patterns among the enumerate bit-flip patterns are applied to the hard decision decoded received vector z. In some embodiments, only a predetermined number of the least reliable independent bits in the k most reliable independent bits are to be applied to the hard decision decoded received vector z. For example, when the predetermined number is set as 3, in the sequence 500 of FIG. 5, the filtered set of bit-flip patterns would include patterns that has bits of k0(1.1), k1(2), and/or k2(4). Such a subset of bit-flip patterns would be k0(1.1), k1(2), k2(4), k0(1.1) k1(2), k0(2) k2(4), k1(2) k2(4), and k0(1.1) k1(2) k2(4).

In some embodiments, only the bit-flip patterns that include bits that have a predetermined maximum reliability metric are to be applied to the hard decision decoded received vector z. For example, when a maximum reliability metric is set to 4, only the bit bits that have a reliability metric that is no more than 4 will be flipped. In such a case, in the sequence 500 of FIG. 5, only k0 (having a reliability metric 1.1), k1 (having a reliability metric 2), and k2 (having a reliability metric 4) may be included in the set of bit-flip patterns. The filtered set of bit-flip patterns would include k0(1.1), k1(2), k2(4), k0(1.1) k1(2), k0(1.1) k2(4), k1(2) k2(4), and k0(1.1) k1(2) k2(4).

In some embodiments, only the bit-flip patterns that have a predetermined maximum weight are to be applied to the hard decision decoded received vector z. A weight indicates a number of bits in a bit-flip pattern that are to be flipped. The maximum weight indicates a maximum number of bits in each bit-flip patterns that are to be flipped. For example, if the maximum weight is 3, the maximum number of bits that are to be flipped is 3, and the set of bit-flip patterns would only include patterns having weights 1 through 3. In such a case, in the sequence 500 of FIG. 5, the filtered set of bit-flip patterns would include (i) weight 1 patterns, such as k0(1.1), k1(2), k2(4), . . . , kk( ), (ii) weight 2 patterns, such as k0(1.1) k1(2), k0(1.1) k2(4), . . . , k0(1.1) kk( ), and (iii) weight 3 patterns, such as k0(1.1) k1(2) k2(4), k0(1.1) k1(2) k3(7), . . . , k0(1.1) k1(2) kk( ), k1(2) k2(4) k3(7), . . . , k1(2) k2(4) kk( ), . . . , kk−2( ) kk−1( ) kk( ).

Further, the enumerated set of bit-flip patterns are sorted based on the current channel realized reliability metrics of the bit bits that are to be flipped. The bit-flip pattern that includes bit bits with the combined lowest current channel realized reliability metrics is applied first. As used herein, a combined reliability includes a reliability metric for when reliability of multiple bits is determined, but can also refer to a reliability metric for a single bit. The combined current channel realized reliability metrics may be defined based on different algorithms. In some embodiments, a combined reliability metric is defined as a sum of the current channel realized reliability metrics of the multiple bit bits. For example, when a bit-flip pattern includes k0 (having a reliability metric 1.1) and k1 (having a reliability metric 2), the combined reliability metric for k0 and k1 is 3.1=1.1+2, which is denoted as k0 k1(3.1). The bit-flip patterns sorted in increasing order based on the current channel realized reliability metrics or the combined current channel realized reliability metrics would be for the illustrated example: k0(1.1), k1(2), k0 k1(3.1), k2(4), k0 k2(5.1), k3(7), k0 k1 k2 (7.1) . . . .

In some embodiments, a maximum reliability metric threshold is set, and only the bit-flip patterns that have a reliability metric or a combined reliability metric that is no greater than a threshold are to be applied to the hard decision decoded received vector z. For example, when the maximum reliability metric threshold is set as 7, the set of bit-flip patterns would only include the bit-flip patterns that have a reliability metric or a combined reliability metric that is no more than 7. In such a case, in the sequence 500 of FIG. 5, the filtered set of bit-flip patterns would only include k0(1.1), k1(2), k0 k1(3.1), k2(4), k0 k2(5.1), k3(7).

In some embodiments, a maximum number of bit-flip patterns is set, and only up to the maximum number of bit-flip patterns that have the lowest current channel realized reliability metrics are to be applied to the hard decision decoded received vector z. For example, when the predetermined number is set as 3, in the sequence 500 of FIG. 5, the filtered set of bit-flip patterns would only include k0(1.1), k1(2), k0 k1(3.1).

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
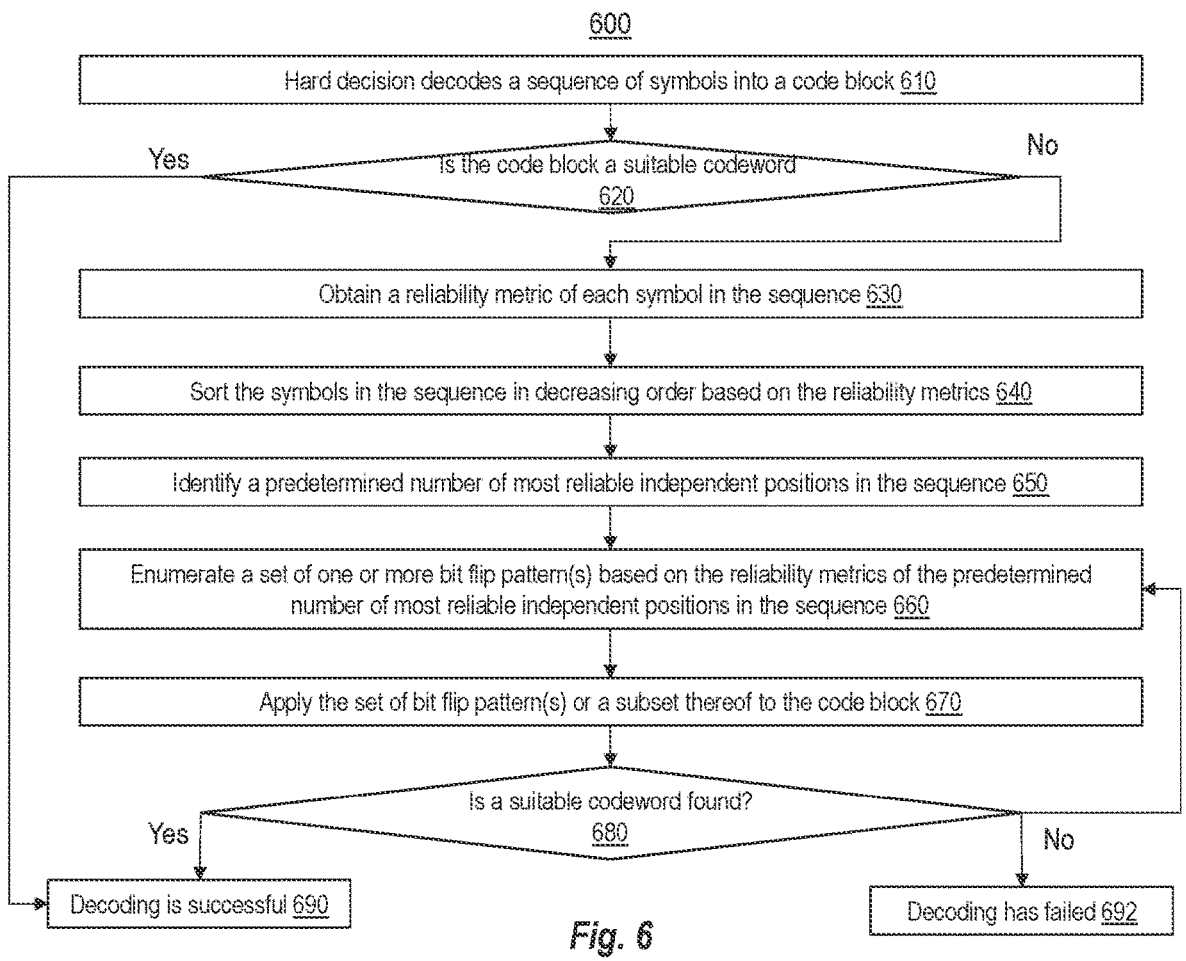
FIG. 6 illustrates a flowchart of an example of a method for enumerating a set of one or more bit-flip patterns based on reliability metrics of a predetermined number of most reliable independent bits.

FIG. 6 illustrates a flowchart of an example of the current channel realization decoding method 600, which may be implemented at the FEC decoder 226 of FIG. 2 or 600 of FIG. 6. The method 600 includes hard decision decoding a sequence of symbols into a received vector (act 610) and determining whether the received vector is a suitable codeword (act 620). When the received vector is a suitable codeword (act 620, "Yes" side), decoding is successful (act 690). In response to determining that the received vector is not a suitable codeword (act 620, "No" side), a reliability metric of each symbol in the sequence is obtained (act 630). The symbols in the sequence are then sorted in decreasing order based on the current channel realized reliability metrics (act 640). Next, a predetermined number of most reliable independent bits in the sequence is identified (act 650), which may be achieved by a series of transformations of a generator matrix G, where the generator matrix G is a matrix used to encode a k bit message into an n bit codeword.

Based on the current channel realized reliability metrics of the predetermined number of the most reliable independent bits, a set of one or more bit-flip pattern(s) is enumerated (act 660). The set of one or more bit-flip pattern(s) or a subset thereof are applied to the received vector (act 670). When a bit-flip pattern is applied to the received vector, a new codeword is generated. It is then determined whether the new codeword matches the received vector (or is within some distance of the received vector) (act 680). In response to finding a codeword within a predetermined distance of the received vector, decoding is successful (act 690). On the other hand, if no codeword within the predetermined distance of the received vector is found after applying each bit-flip pattern in the set or the subset, decoding has failed (act 692). Alternatively, or in addition, when no suitable codeword, i.e., a codeword with a suitably small distance to the received vector, is found after applying each bit-flip pattern in the set, a new set of one or more bit-flip pattern(s) are enumerated (act 660), and the new set of bit-flip pattern(s) or a subset thereof are applied to the received vector (act 670). This process may repeat until a suitably close codeword is found or a predetermined condition is met.

Figure 7:
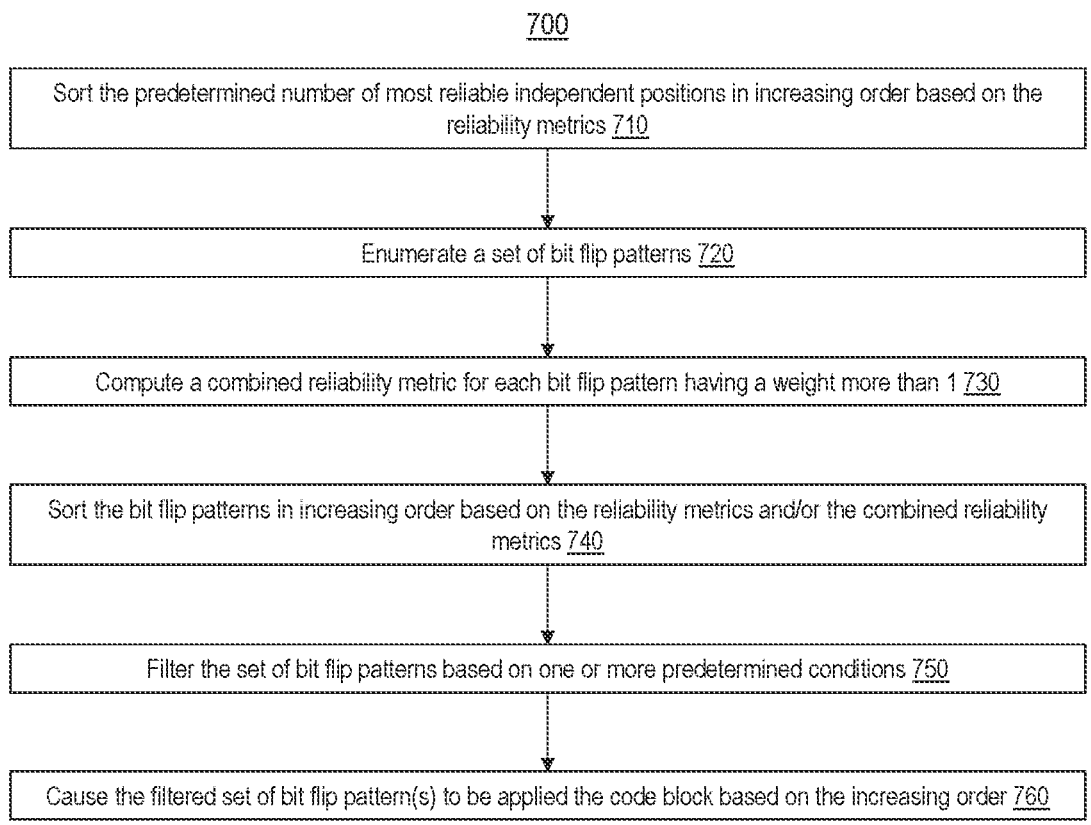
FIG. 7 illustrates a flowchart of an example of a method for enumerating a set of one or more flip patterns.

FIG. 7 illustrates a flowchart of an example of a method for enumerating a set of one or more flip patterns. The method 700 includes sorting the predetermined number of most reliable independent bits in increasing order based on the current channel realized reliability metrics (act 710) and enumerating a set of bit-flip patterns (act 720). In some embodiments, enumerated set of bit-flip patterns may have a predetermined maximum weight. The method 700 further includes computing a combined reliability metric for each bit-flip pattern having a weight more than 1 (act 730) and sorting the bit-flip patterns in increasing order based on the current channel realized reliability metrics and/or the combined current channel realized reliability metrics (act 740). In some embodiments, the method 700 further includes filtering the set of bit-flip patterns based on one or more predetermined conditions (act 750), and causing the filtered set of bit-flip patterns (i.e., a subset of the enumerated bit-flip patterns) to be applied to the received vector based on the increasing order (act 760).

Figure 8:
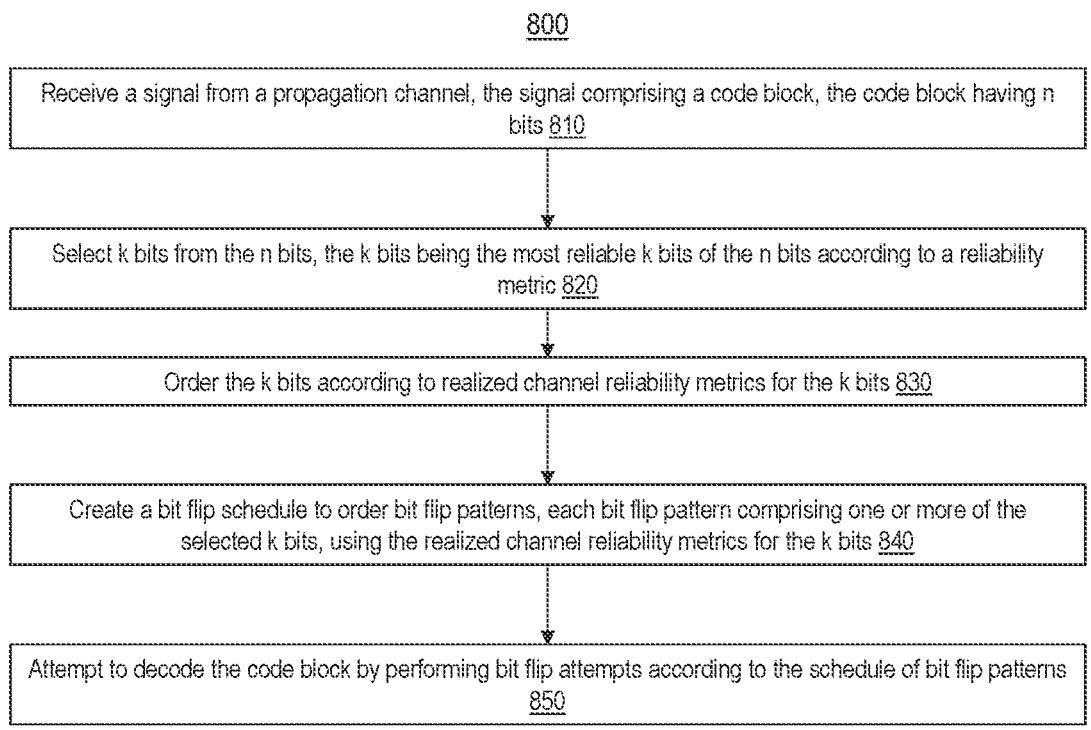
FIG. 8 illustrates an example of a method for performing current channel realization decoding.

FIG. 8 illustrates a flowchart of an example of a method 800 for performing current channel realization decoding. The method 800 includes, at a receiver, receiving a signal from a propagation channel, the signal comprising a received vector, the received vector having n bits (act 810).

The method 800 further includes selecting k bits from the n bits, the k bits being the most reliable k bits of the n bits according to a reliability metric (act 820).

The method 800 further includes ordering the k bits according to current channel realized reliability metrics for the k bits (act 830).

The method 800 further includes creating a bit flip schedule to order bit flip patterns, each bit flip pattern comprising one or more of the selected k bits, using the current channel realized reliability metrics for the k bits (act 840).

The method 800 further includes attempting to decode the received vector by performing bit flip attempts according to the schedule of bit flip patterns (act 850).

The method 800 further may be practiced where the realized reliability metric is a log-likelihood ratio (LLR).

The method 800 further may be practiced where the bit flip schedule is generated through a decision tree based on the realized current channel realized reliability metrics.

The method 800 further may be practiced where the n bits include k message bits and n-k parity bits.

The method 800 further may be practiced where creating the bit flip schedule comprises:
  for each bit-flip pattern in the bit-flip schedule, computing a combined realized reliability metric based on individual realized current channel realized reliability metrics of constituent bits;
  ordering the bit flip patterns in the bit flip schedule based on the combined realized current channel realized reliability metrics thereof; and
  wherein attempting to decode the received vector by performing bit flip attempts according to the schedule of bit flip patterns comprises applying the bit flip patterns in increasing order based on the realized channel combined current channel realized reliability metrics, starting from a bit-flip pattern corresponding to a lowest combined realized reliability metric toward a bit-flip pattern corresponding to a highest combined realized reliability metric.

Some such embodiments of the method 800 may be practiced where each combined realized reliability metric is a sum of current channel realized reliability metrics of the constituent bits.

Alternatively or additionally, some such embodiments of the method 800 may be practiced where the method further includes:
  filtering the bit-flip patterns based one or more predetermined conditions to generate a subset of bit-flip patterns, and
  applying bit flip patterns in the subset of the bit-flip patterns to the received vector while excluding filtered bit flip patterns.

Some such embodiments of the method 800 may be practiced where the one or more predetermined conditions include a maximum number of least reliable bits from the k bits, such that only a subset of bit-flip patterns that include up to the maximum number of least reliable bits can be applied to the received vector.

Alternatively, or additionally, some such embodiments of the method 800 may be practiced where the one or more conditions include a maximum realized channel combined reliability metric, such that only a subset of bit-flip patterns that have a realized channel combined reliability metric that is no more than the maximum realized reliability metric can be applied to the received vector.

Alternatively, or additionally, some such embodiments of the method 800 may be practiced where the one or more conditions include a maximum weight, indicating a maximum number of bits are to be flipped, such that only a subset of bit-flip patterns that have a weight that is no more than the maximum weight can be applied to the received vector.

Alternatively, or additionally, some such embodiments of the method 800 may be practiced where the one or more conditions include a maximum number of bit-flip patterns that are to be applied, such that only a subset of the maximum number of bit-flip patterns can be applied to the received vector.

The method 800 may further include: generating a second set of bit-flip patterns based on the current channel realized reliability metrics of the predetermined most reliable independent bits; and in response to finding no suitable codeword after applying the set of bit-flip patterns, applying the second set of bit-flip patterns to the received vector.

Some such embodiments of the method 800 may be practiced where generating a second set of bit-flip patterns and the applying the set of bit-flip patterns are performed simultaneously.

Alternatively, or additionally, some such embodiments of the method 800 may be practiced where each bit-flip pattern in the set of bit-flip patterns has a first weight, indicating a first number of one or more bits that are to be flipped; each bit-flip pattern in the second set of bit-flip patterns has a second weight, indicating a second number of one or more bits that are to be flipped; and the second weight is greater than the first weight. In some such embodiments, the second weight is greater than the first weight by one.

The outlined operations are only provided as examples, and some of the operations may be optional, combined into fewer steps and operations, supplemented with further operations, or expanded into additional operations without detracting from the essence of the disclosed embodiments.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A current channel realization decoding method, the method comprising:
   at a receiver, receiving a signal from a propagation channel, the signal comprising a received vector, the received vector having n bits;
   selecting k bits from the n bits, the k bits being the most reliable k bits of the n bits according to a reliability metric;
   ordering the k bits to obtain first ordered k bits, according to current channel realized reliability metrics for the k bits;
   identifying most reliable independent bits in the k bits;
   generating a set of bit-flip patterns by sorting the identified most reliable independent bits to obtain second ordered k bits, and using the second ordered k bits to generate bit-flip patterns;
   identifying ones of the bit-flip patterns in the set with current channel realized reliability metrics below a maximum reliability metric threshold;
   creating a bit flip schedule to order the identified ones of the bit flip patterns of the set, each bit flip pattern comprising one or more of the selected k bits, using the current channel realized reliability metrics for the k bits, wherein unidentified ones of the bit flip patterns are excluded from the bit flip schedule; and
   attempting to decode the received vector by performing bit flip attempts according to the bit flip schedule.

2. The method of claim 1, wherein each of the current channel realized reliability metrics is a log-likelihood ratio (LLR).

3. The method of claim 1, wherein the bit flip schedule is generated through a decision tree based on the current channel realized reliability metrics.

4. The method of claim 1, further comprising terminating attempting to decode the received vector when a codeword is found having a reliability metric below a predetermined threshold, wherein the predetermined threshold is selected to guarantee a Maximum Likelihood decoding solution.

5. The method of claim 1, wherein creating the bit flip schedule comprises:
   for each bit-flip pattern in the bit-flip schedule, computing a combined realized reliability metric based on individual realized current channel realized reliability metrics of constituent bits;
   ordering the bit flip patterns in the bit flip schedule based on the combined realized current channel realized reliability metrics thereof; and
   wherein attempting to decode the received vector by performing bit flip attempts according to the schedule of bit flip patterns comprises applying the bit flip patterns in increasing order based on the realized combined current channel realized reliability metrics, starting from a bit-flip pattern corresponding to a lowest combined realized reliability metric toward a bit-flip pattern corresponding to a highest combined realized reliability metric.

6. The method of claim 5, wherein each combined realized reliability metric is a sum of current channel realized reliability metrics of the constituent bits.

7. The method of claim 5, the method further comprising:
   filtering the bit-flip patterns based one or more predetermined conditions to generate a subset of bit-flip patterns, and
   applying bit flip patterns in the subset of the bit-flip patterns to the received vector while excluding filtered bit flip patterns.

8. The method of claim 7, wherein the one or more predetermined conditions include a maximum number of least reliable bits from the k bits, such that only a subset of bit-flip patterns that include up to the maximum number of least reliable bits can be applied to the received vector.

9. The method of claim 7, wherein the one or more conditions include a maximum weight, indicating a maximum number of bits are to be flipped, such that only a subset of bit-flip patterns that have a weight that is no more than the maximum weight can be applied to the received vector.

10. The method of claim 7, wherein the one or more conditions include a maximum number of bit-flip patterns that are to be applied, such that only a subset of the maximum number of bit-flip patterns can be applied to the received vector.

11. The method of claim 1, wherein the kbits are ordered in an order of decreasing reliability to obtain first ordered k bits and the identified most reliable independent bits are sorted in an order of increasing reliability to obtain the second ordered k bit.

12. The method of claim 11, wherein generating the second set of bit-flip patterns and applying the set of bit-flip patterns are performed simultaneously.

13. The method of claim 11, wherein:
   each bit-flip pattern in the set of bit-flip patterns has a first weight, indicating a first number of one or more bits that are to be flipped;
   each bit-flip pattern in the second set of bit-flip patterns has a second weight, indicating a second number of one or more bits that are to be flipped; and
   the second weight is greater than the first weight.

14. The method of claim 13, wherein the second weight is greater than the first weight by one.

15. A receiver, the receiver comprising:
   receive hardware configured to receive a signal from a propagation channel, the signal comprising a received vector having n bits; and
   one or more decoders, wherein the one or more decoders are configured to perform the following:
   selecting k bits from the n bits, the k bits being the most reliable k bits of the n bits according to a reliability metric;
   ordering the k bits to obtain first ordered k bits according to current channel realized reliability metrics for the k bits;
   identifying most reliable independent bits in the k bits;
   generating a set of bit-flip patterns by sorting the identified most reliable independent bits to obtain second ordered k bits, and using the second ordered k bits to generate bit-flip patterns;
   identifying ones of the bit-flip patterns in the set with current channel realized reliability metrics below a maximum reliability metric threshold;

creating a bit flip schedule to order the identified ones of the bit flip patterns of the set, each bit flip pattern comprising one or more of the selected k bits, using the current channel realized reliability metrics for the k bits, wherein unidentified ones of the bit flip patterns are excluded from the bit flip schedule; and attempting to decode the received vector by performing bit flip attempts according to the bit flip schedule of bit flip patterns.

16. The receiver of claim 15, wherein creating the bit flip schedule comprises:

for each bit-flip pattern in the bit-flip schedule, computing a combined realized reliability metric based on individual realized current channel realized reliability metrics of constituent bits;

ordering the bit flip patterns in the bit flip schedule based on the combined realized current channel realized reliability metrics thereof; and wherein attempting to decode the received vector by performing bit flip attempts according to the schedule of bit flip patterns comprises applying the bit flip patterns in increasing order based on the realized channel combined current channel realized reliability metrics, starting from a bit-flip pattern corresponding to a lowest combined realized reliability metric toward a bit-flip pattern corresponding to a highest combined realized reliability metric.

17. The receiver of claim 16, wherein the one or more decoders are configured to perform:

filtering the bit-flip patterns based one or more predetermined conditions to generate a subset of bit-flip patterns, and applying bit flip patterns in the subset of the bit-flip patterns to the received vector while excluding filtered bit flip patterns.

18. The receiver of claim 16, wherein the one or more predetermined conditions include at least one of:

a maximum number of least reliable bits from the k bits, such that only a subset of bit-flip patterns that include up to the maximum number of least reliable bits can be applied to the received vector;

a maximum number of bits are to be flipped, such that only a subset of bit-flip patterns that have a weight that is no more than the maximum weight can be applied to the received vector; or a maximum number of bit-flip patterns that are to be applied, such that only a subset of the maximum number of bit-flip patterns can be applied to the received vector.

19. A receiver computer system configured to perform ordered statistic decoding, the receiver computer system comprising:

one or more processors; and one or more computer-readable media having stored thereon instructions that are executable by the one or more processors to configure the computer system to perform ordered statistic decoding, including instructions that are executable to configure the computer system to perform at least the following:

receive a signal from a propagation channel, the signal comprising a received vector, the received vector having n bits;

select k bits from the n bits, the k bits being the most reliable k bits of the n bits according to a reliability metric;

order the k bits to obtain first ordered k bits according to current channel realized reliability metrics for the k bits;

identify most reliable independent bits in the k bits;

generate a set of bit-flip patterns by sorting the identified most reliable independent bits to obtain second ordered k bits, and using the second ordered k bits to generate bit-flip patterns;

identify ones of the bit-flip patterns in the set with current channel realized reliability metrics below a maximum reliability metric threshold;

create a bit flip schedule to order the identified ones of the bit flip patterns, each bit flip pattern comprising one or more of the selected k bits, using the current channel realized reliability metrics for the k bits, wherein unidentified ones of the bit flip patterns are excluded from the bit flip schedule; and attempt to decode the received vector by performing bit flip attempts according to the bit flip schedule of bit flip patterns.

* * * * *